US 9,726,072 B2

(12) United States Patent
Brinkmann et al.

(10) Patent No.: US 9,726,072 B2
(45) Date of Patent: Aug. 8, 2017

(54) MOTOR VEHICLE AND ADAPTATION METHOD

(71) Applicant: Ford Global Technologies, LLC, Dearborn, MI (US)

(72) Inventors: Franz J. Brinkmann, Huerth-Efferen (DE); Kai Sebastian Kuhlbach, Bergisch Gladbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 66 days.

(21) Appl. No.: 14/752,419

(22) Filed: Jun. 26, 2015

(65) Prior Publication Data

US 2016/0003130 A1    Jan. 7, 2016

(30) Foreign Application Priority Data

Jul. 7, 2014   (DE) .................... 10 2014 213 099

(51) Int. Cl.
*F02B 33/44* (2006.01)
*F02B 37/013* (2006.01)
(Continued)

(52) U.S. Cl.
CPC .......... *F02B 37/013* (2013.01); *F02B 37/002* (2013.01); *F02B 37/007* (2013.01);
(Continued)

(58) Field of Classification Search
CPC .... F02B 37/002; F02B 37/007; F02B 37/013; F02B 37/12; F02B 37/183; F02D 23/00;
(Continued)

(56) References Cited

U.S. PATENT DOCUMENTS 4,474,008 A * 10/1984 Sakurai ................... F02B 37/12
123/568.27
5,063,744 A * 11/1991 Ishiyama .............. F02B 37/013
60/600

(Continued)

FOREIGN PATENT DOCUMENTS

DE          4007584 A1    9/1990
DE         19711307 A1   10/1997
(Continued)

*Primary Examiner* — Jesse Bogue
(74) *Attorney, Agent, or Firm* — Julia Voutyras; McCoy Russell LLP

(57) ABSTRACT

An engine system for a motor vehicle is provided. The engine system includes a first exhaust-gas turbine in a first turbocharger driven by exhaust gas from the engine, a second exhaust-gas turbine in a second turbocharger driven by exhaust gas from the engine, a bypass coupled upstream and downstream of the first exhaust-gas turbine, and a pneumatic charge pressure control device including a bypass valve positioned in the bypass and a charge pressure control valve pneumatically coupled to the bypass valve and an intake line downstream of a first compressor included in the first turbocharger, the pneumatic charge pressure control device further including an adaptation unit pneumatically coupled to the bypass valve and an exhaust line upstream of the second exhaust-gas turbine.

13 Claims, 2 Drawing Sheets

(51) Int. Cl.
*F02B 37/12* (2006.01)
*F02B 37/18* (2006.01)
*F02D 23/00* (2006.01)
*F02D 41/00* (2006.01)
*F02D 41/14* (2006.01)
*F02B 37/00* (2006.01)
*F02B 37/007* (2006.01)

(52) U.S. Cl.
CPC ............ *F02B 37/12* (2013.01); *F02B 37/183* (2013.01); *F02D 23/00* (2013.01); *F02D 41/0007* (2013.01); *F02D 41/1448* (2013.01); *Y02T 10/144* (2013.01)

(58) Field of Classification Search
CPC . F02D 41/0007; F02D 41/1448; Y02T 10/144
See application file for complete search history.

(56) References Cited

U.S. PATENT DOCUMENTS

| | | | | |
|---|---|---|---|---|
| 5,081,842 A | * | 1/1992 | Sugiyama | F02B 37/007 60/600 |
| 5,090,203 A | * | 2/1992 | Okimoto | F02B 37/007 60/601 |
| 5,142,866 A | * | 9/1992 | Yanagihara | F02B 37/013 60/605.2 |
| 5,974,801 A | * | 11/1999 | Houtz | F02B 37/013 60/602 |
| 9,151,217 B2 | * | 10/2015 | Hilditch | F02B 37/12 |
| 2009/0107140 A1 | * | 4/2009 | Pursifull | B60W 10/10 60/600 |
| 2010/0300087 A1 | | 12/2010 | Liu et al. | |
| 2011/0023481 A1 | | 2/2011 | Baeuerle | |
| 2011/0113773 A1 | | 5/2011 | Liu et al. | |
| 2013/0247561 A1 | | 9/2013 | Russ | |

FOREIGN PATENT DOCUMENTS

| | | |
|---|---|---|
| DE | 102006054044 A1 | 5/2008 |
| DE | 102007039217 A1 | 2/2009 |
| DE | 102010021432 A1 | 1/2011 |
| DE | 102009028117 A1 | 2/2011 |
| EP | 2489851 A1 | 8/2012 |
| WO | 2010102745 A1 | 9/2010 |

* cited by examiner

MOTOR VEHICLE AND ADAPTATION METHOD

CROSS REFERENCE TO RELATED APPLICATIONS

The present application claims priority to German Patent Application No. 102014213099.9, filed on Jul. 7, 2014, the entire contents of which are hereby incorporated by reference for all purposes.

FIELD

The present disclosure relates to a motor vehicle having multiple turbochargers.

BACKGROUND AND SUMMARY

Motor vehicles having an internal combustion engines can include turbochargers to increase engine performance. However, turbochargers are not designed to operate efficiently over a wide range of engine conditions. Therefore, dual turbochargers have been developed to increase the operating range over which the turbocharger system can efficiently function. In a dual turbocharger system the turbochargers may be selectively operated via electronic actuation of turbine shut-off valves. However, turbocharger performance may be negatively impacted during transition operation in the turbochargers, such as when the one of the turbochargers is shut-off or turned on, due to delays in the wastegate actuation systems.

As such in one approach, an engine system for a motor vehicle is provided to overcome at least some of the aforementioned problems. The engine system includes a first exhaust-gas turbine in a first turbocharger driven by exhaust gas from the engine, a second exhaust-gas turbine in a second turbocharger driven by exhaust gas from the engine, a bypass coupled upstream and downstream of the first exhaust-gas turbine, and a pneumatic charge pressure control device including a bypass valve positioned in the bypass and a charge pressure control valve pneumatically coupled to the bypass valve and an intake line downstream of a first compressor included in the first turbocharger, the pneumatic charge pressure control device further including an adaptation unit pneumatically coupled to the bypass valve and an exhaust line upstream of the second exhaust-gas turbine. Using a pneumatic charge pressure control device having an adaptation unit pneumatically coupled to the exhaust line upstream of the second exhaust-gas turbine enables delays in the turbine bypass actuation to be reduced when compared to previously turbine wastegate actuation systems. As a result, turbocharger and therefore engine efficiency is increased.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

DETAILED DESCRIPTION

Figure 1:
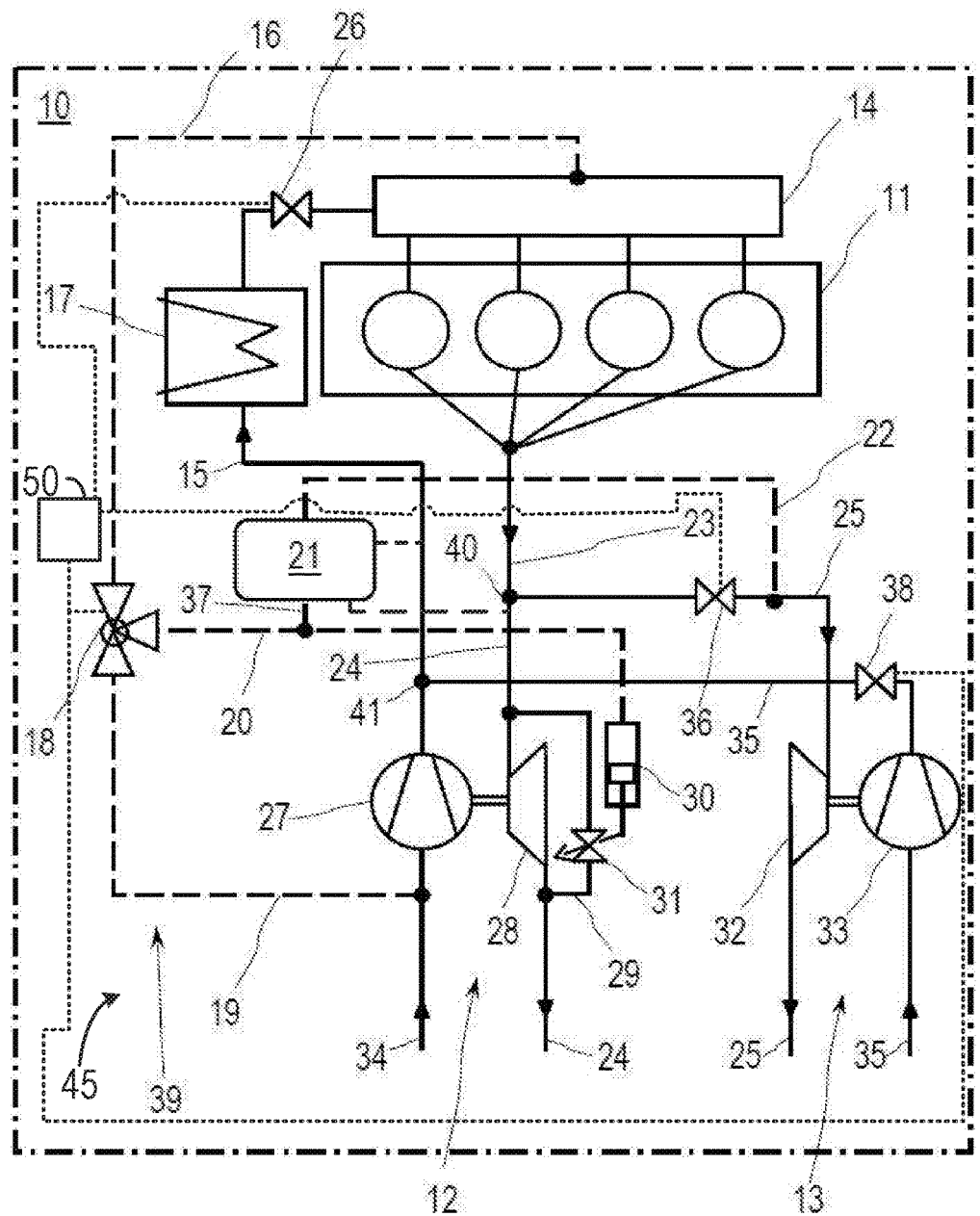
FIG. 1 shows a schematic diagram of a motor vehicle.

DE 102009028117 A1 discloses a method and a device for the operation of a wastegate adjustment drive for a wastegate for controlling the exhaust-gas enthalpy absorbed by the turbine. The wastegate is electrically adjustable by means of the actuating drive and is arranged in an exhaust tract of an internal combustion engine. An exhaust-gas flow rate passing through the exhaust-gas turbocharger can be adjusted in a manner dependent on an opening position of the wastegate. In the method for operating the adjustment drive, when the wastegate is in a closed position, the adjustment drive is actuated with electrical power so as to provide a varying closing pressure of the wastegate in a manner dependent on a profile of an exhaust-gas back pressure prevailing across the wastegate. Electrically adjustable wastegates are susceptible to thermal stresses and therefore increased likelihood of component failure due to the high temperatures in the exhaust system. As a result, the electrically adjustable wastegates may not function as intended when components in the wastegate are thermally degraded.

DE 102010021432 A1 has disclosed methods, and systems suited to said methods, for the control of a sequential two-stage turbocharger of an internal combustion engine. A disclosed method for controlling an engine having a turbocharging system with a high-pressure turbocharger and with a low-pressure turbocharger comprises the determination of a potential charge pressure, which corresponds to a high-pressure turbine bypass valve in a closed position, when said turbine bypass valve is in a fully open position, and the closure of the bypass valve such that a high-pressure compressor operates with the potential charge pressure in a desired high-pressure working range such that a desired charge pressure is maintained, and the holding of the high-pressure turbine bypass valve in an open position. A further method disclosed by DE 102010021432 A1 for controlling an engine comprises the opening of a high-pressure turbine bypass valve of a turbocharging system, the determination of a first predicted charge pressure, when the high-pressure turbine bypass valve is in an open position, for a first position of a turbine with variable geometry, the determination of a second charge pressure, when the high-pressure turbine bypass valve is in the open position, for a second position of the variable geometry, the determination of a desired charge pressure, and the closure of the high-pressure turbine bypass valve when the signal for the desired charge pressure lies between the first predicted charge pressure and the second predicted charge pressure. Using two turbine bypass valves (i.e., wastegates) and a variable geometry turbine increases the cost and complexity of the engine system. Moreover, variable geometry turbines have a decreased longevity when compared to fixed geometry turbines.

WO 2010102745 A1 discloses an internal combustion engine, in particular for a motor vehicle, having at least one first exhaust-gas turbocharger which has at least one first turbine and at least one first compressor, and at least one second exhaust-gas turbocharger which has at least one second turbine and at least one second compressor. The first and the second turbine are arranged in an exhaust tract of the internal combustion engine so as to be in parallel with one another with respect to an exhaust-gas mass flow. The first and the second compressor are arranged in a fresh-air tract of the internal combustion engine so as to be in parallel with one another with respect to a fresh-air mass flow. At least one valve device is arranged and formed in the exhaust tract such that said valve device, in a manner dependent on an operating state of the internal combustion engine, selectively reduces and/or stops the exhaust-gas mass flow through the second turbine and at the same time permits an unrestricted exhaust-gas mass flow through the first turbine, such that a charge pressure is generated substantially only by the first exhaust-gas turbocharger. At least one additional further drive device is arranged at the second exhaust-gas turbocharger in addition to the second turbine. Furthermore, WO 2010102745 A1 presents a method for operating an internal combustion engine, wherein fresh air is compressed in at least two exhaust-gas turbochargers by means of a respective compressor. The respective compressor is driven by a respective exhaust-gas turbine. In a manner dependent on an operating point of the internal combustion engine, a second exhaust-gas turbocharger is activated in addition to a first exhaust-gas turbocharger. Before the activation, the second exhaust-gas turbocharger is accelerated to a predetermined rotational speed. The acceleration of the second exhaust-gas turbocharger to the predetermined rotational speed is in this case performed at least partially by way of a drive provided in addition to the exhaust-gas turbine of the second exhaust-gas turbocharger. In the system disclosed WO 2010102745 engine performance may be impacted when transitioning into operation of the second exhaust-gas turbocharger. For instance, the output of the first exhaust-gas turbocharger may decrease when the second exhaust gas turbocharger is activated.

The present invention is based on the objective of providing a motor vehicle and an adaptation method such that an activation of a second turbocharger in addition to a first turbocharger can be performed in an improved manner to overcome at least some of the aforementioned problems.

Said objective may be achieved by the motor vehicle and method for motor vehicle control described herein. The motor vehicle may include an engine, a supply air tract, a throttle flap arranged in the supply air tract, and an exhaust tract which comprises a first exhaust line and a second exhaust line. Furthermore, the motor vehicle includes a first turbocharger with a first exhaust-gas turbine and with a first compressor connected in torque-transmitting fashion to the first exhaust-gas turbine, and a second turbocharger with a second exhaust-gas turbine and with a second compressor connected in torque-transmitting fashion to the second exhaust-gas turbine. The first exhaust-gas turbine is arranged in the first exhaust line, and the second exhaust-gas turbine is arranged in the second exhaust line. The compressors are arranged in the supply air tract. The exhaust-gas turbines and thus the compressors can be driven by exhaust gas that is generated during the operation of the engine, whereby a charge pressure can be generated in the supply air tract. Furthermore, the motor vehicle comprises a bypass, which is configured to conduct at least a part of the exhaust gas past the first exhaust-gas turbine, and a bypass valve, which is configured to open up the bypass, such that exhaust gas is conducted through it in a first configuration and block said bypass in a second configuration. The motor vehicle furthermore has a charge-pressure control device which includes a bypass control line and an actuator, which is connected to the bypass control line, for adjusting the bypass valve. The charge-pressure control device is configured to charge the bypass control line with a certain opening pressure when a predefined charge pressure prevails downstream of the throttle flap. The actuator is configured to open the bypass valve, and open up the bypass, when the opening pressure prevails. Additionally, the motor vehicle additionally has an adaptation unit which is configured to reduce the pressure in the bypass control line to a closing pressure which is lower than the opening pressure during selected operating conditions such as when the predefined charge pressure does not prevail downstream of the throttle flap.

In one example, the pressure in the bypass control line may be manipulated independently of the charge-pressure control device. This may be particularly beneficial in the event of an activation of the second turbocharger in addition to the first turbocharger.

In another example, the adaptation unit is configured to generate the closing pressure in the bypass control line in the event of a predefined pressure drop in the supply air tract. Therefore, in one example the adaption unit can be operated pneumatically. It is thus possible for different intake and exhaust lines to be simultaneously utilized for actuating the adaptation unit. No additional actuators are needed if desired. In another example, the adaptation unit is configured to generate the closing pressure in the bypass control line in the event of a predefined pressure drop in the first exhaust line. In a second alternative, the adaptation unit is configured to generate the closing pressure in the bypass control line in the event of a predefined pressure rise in the second exhaust line. It is thus made possible to directly compensate a pressure change, in particular resulting from an activation of the second turbocharger, as a disturbance variable for the regulating loop of the charge-pressure control device. The compensation can thus be performed considerably more rapidly when compared to previous turbocharger systems, and the drop in power of the first turbocharger can be reduced. The activation of the second turbocharger can thus take place in a manner unnoticed by the driver of the motor vehicle. The driving experience can be made more comfortable. Thus, the pressure in the intake system and exhaust system can be used as direct input for bypass valve actuation.

In another advantageous example, the adaptation unit may be connected via an indicator control line to the supply air tract upstream of the throttle flap or to the first exhaust line upstream of the first exhaust-gas turbine or to the second exhaust line upstream of the second exhaust-gas turbine. It is thus made possible, at the locations at which the pressure change occurs first after the activation of the second turbocharger, for said pressure change to be identified.

In another example, the motor vehicle is configured to operate the first turbocharger, or the first turbocharger simultaneously with the second turbocharger, during the operation of the engine. The motor vehicle can thus be operated with sequential turbocharging, in one example.

An adaptation method is also described herein. In the adaptation method, the pressure in the bypass control line may be reduced through operation of the adaptation unit either after a predefined pressure drop is detected in the supply air tract or in the first exhaust line, or after a predefined pressure rise is detected in the second exhaust line. With the adaptation method, it is advantageously possible for the bypass to be closed quickly when the second turbocharger has been activated. A drop in power of the exhaust-gas turbine, and thus of the compressor connected thereto, is thus prevented. A drop in charge pressure is thus limited. By contrast to the conventional regulation performed by the charge pressure control device, the adaptation method makes direct use of the disturbance variable, and compensates the latter. In other words, unwanted changes in pressure in intake or exhaust lines can be directly compensated for via pneumatic actuation of the bypass valve in direct response to the unwanted changes in pressure in the intake or exhaust lines. In this way, the bypass valve can be quickly adjusted after the second turbine is activated, thereby increasing turbocharger and therefore engine efficiency.

FIG. 1 schematically depicts a motor vehicle 10 in an exemplary configuration. The motor vehicle includes an engine 11 which is an internal combustion engine. For the operation thereof, the engine 11 is supplied air via intake lines, tracts, etc. The motor vehicle 10 includes a supply air tract 15 which is configured to conduct supply air from the environment to the engine 11. A throttle flap 26 (e.g., throttle valve) may be arranged in the supply air tract 15. Furthermore, the motor vehicle 10 has a first turbocharger 12 and a second turbocharger 13 configured to compress the supply air to generate a charge pressure in the supply air tract 15. Downstream of the throttle flap 26, there may be arranged a manifold 14 which is designed for the accumulation and distribution of the supply air to individual combustion chambers in the engine 11. Furthermore, a charge-air cooler 17 for cooling the charge air may be provided in the supply air tract 15.

The first turbocharger 12 includes a first exhaust-gas turbine 28 and a first compressor 27 connected in torque-transmitting fashion to the first exhaust-gas turbine 28, and the second turbocharger 13 comprises a second exhaust-gas turbine 32 and a second compressor 33 connected in torque-transmitting fashion to the second exhaust-gas turbine 32. Thus, the turbochargers 12 and 13 may include a drive shaft and/or other suitable mechanical component rotationally coupling the turbines to the compressors.

Furthermore, the motor vehicle 10 has an exhaust tract 23 for discharging exhaust gas that is generated during the operation of the engine 11. The exhaust tract 23 may include multiple branches. In the configuration shown, the exhaust tract 23 divides, at a branching point 40, into a first exhaust line 24 and a second exhaust line 25. The first exhaust-gas turbine 28 is arranged in the first exhaust line 24, and the second exhaust-gas turbine 32 is arranged in the second exhaust line 25. The first turbocharger 12 and the second turbocharger 13 are thus arranged in parallel. A turbine shut-off valve 36 may be arranged in the second exhaust line 25. The turbine shut-off valve may be configured to permit and inhibit exhaust gas flow to the second exhaust-gas turbine 32.

The first turbocharger 12 and the second turbocharger 13 are preferably arranged for sequential parallel operation, such that the first turbocharger 12 can be operated on its own or, at relatively high loads, together with the second turbocharger 13.

The supply air tract 15 may also be composed of multiple supply air lines. In the configuration shown, the motor vehicle 10 has a first supply air line 34 and a second supply air line 35. The first supply air line 34 and the second supply air line 35 merge at a confluence point 41. In this case, the first compressor 27 is arranged in the first supply air line 24 and the second compressor 33 is arranged in the second supply air line 35. The two compressors 27, 33 are thus arranged in parallel. The confluence point 41 is in this case arranged upstream of the charge-air cooler 17. A compressor shut-off valve 38 may be arranged in the supply air line 35.

In the configuration shown, the motor vehicle 10 has a bypass 29 which bypasses the first exhaust-gas turbine 28. A bypass may likewise be arranged so as to bypass the second exhaust-gas turbine 32. The bypass 29 is configured to conduct at least a part of the exhaust gas past the first exhaust-gas turbine 28. The bypass 29 is equipped with a bypass valve 31, which is adjustable. The bypass valve 31 is adjustable (e.g., pneumatically adjustable) to control the charge pressure provided by the first turbocharger. For this purpose, the motor vehicle 10 has a charge-pressure control device 39.

The charge-pressure control device 39 includes an actuator 30, which is connected to the bypass valve 31 and which serves for actuating the bypass valve 31, and at least one bypass control line 20. The bypass control line 20 is connected to the actuator 30. The actuator 30 may be a pressure capsule which is configured to open the bypass valve 31 in the presence of a predefined pressure provided via the bypass control line 20. The predefined pressure is in this case referred to as opening pressure. By opening the bypass valve 31, at least a part of the exhaust gas is conducted past the first exhaust-gas turbine 28. The exhaust gas that is conducted past does not drive the first exhaust-gas turbine 28. The power of the first exhaust-gas turbine 28 can thus be throttled, and the charge pressure generated by the first compressor 27 reduced. The charge-pressure control device 39 shown has, for this purpose, a charge-pressure control line 16, a relief control line 19, and a charge-pressure control valve 18. In the configuration shown, the charge-pressure control valve 18 is a three-way valve and is connected to the charge-pressure control line 16 and to the bypass control line 20 and to the relief control line 19. The charge-pressure control line 16 is connected, downstream of the throttle flap 26, to the supply air line 15. In the configuration shown, the charge-pressure control line 16 is coupled to the manifold 14. The charge-pressure control line 16 picks off the pressure prevailing in the manifold 14 and makes said pressure available for the adjustment of the bypass valve 31. The charge-pressure control valve 18 is configured to charge the bypass control line 20 with the pressure prevailing in the charge-pressure control line 16, and thus adjust the actuator 30. Likewise, the charge-pressure control valve 18 is configured to discharge pressure into the relief control line 19. In a manner dependent on the times at which the charge-pressure control valve 18 opens to the control lines 16, 19 and 20, a defined pressure can be generated in the bypass control line 20, and thus the actuator 30 and the bypass valve 31 can be adjusted. The charge-pressure control valve 18 is controlled in particular by an engine control unit 50 of the motor vehicle 10. The engine control unit 50 is configured to adjust the charge-pressure control valve 18 based on turbocharger operating conditions. As shown, the charge-pressure control valve 18 is pneumatically coupled to the manifold 14, the first supply air line 34, and the actuator 30.

Additionally, the motor vehicle 10 has an adaptation unit 21 in addition to the charge-pressure control device 39. The adaptation unit 21 is coupled (e.g., pneumatically coupled) to the bypass control line 20. The adaptation unit 21 is configured to reduce the pressure in the bypass control line 20 to a closing pressure. The closing pressure is lower than the opening pressure. When the actuator 30 is charged with the closing pressure, the bypass valve 31 is closed, and the bypass 29 is blocked.

The adaptation unit 21 has, in particular, a manipulation control line 37. The manipulation control line 37 is coupled to the bypass control line 20. Furthermore, the adaptation unit 21 may include an indicator control line 22 which, in the configuration shown, is connected to the second exhaust line 25 downstream of the turbine shut-off valve 36. Alternatively, the indicator control line 22 may also be connected to the first exhaust line 24 downstream of the branching point 40 and upstream of the first exhaust-gas turbine 28. It is also possible for the indicator control line 22 to be connected to the supply air tract 15 downstream of the confluence point 41 and upstream of the charge-air cooler 17. Depending on the configuration, the adaptation unit 21 is configured to generate the closing pressure in the bypass control line 20 in the event of a predefined pressure rise in the second exhaust line 25 or in the event of a predefined pressure drop in the first exhaust line 24 or in the event of a predefined pressure drop in the supply air tract 15.

If, during the operation of the motor vehicle 10, the second turbocharger 13 is activated in addition to the first turbocharger 12, the pressures in the working lines change. The working lines are illustrated in FIG. 1 by solid lines. At the moment of activation of the second turbocharger 13, for example as a result of the opening of the turbine shut-off valve 36, the pressure in the second exhaust line 25 increases. The pressure in the first exhaust line 24 likewise decreases. Owing to the decrease in pressure in the first exhaust line 24, the power of the compressor 27 connected to the first exhaust-gas turbine 28 is reduced. Therefore, a pressure drop in the inlet air tract 15 is also affected upon the activation of the second turbocharger 13. The adaptation unit 21 is configured to react to these changes. The indicator control line 22 enables these pressure changes to be identified and trigger in particular a pneumatic mechanism in the adaptation unit 21 in order to reduce the pressure in the bypass control line 20. The indicator control line 22 pneumatically couples the adaptation unit 21 to the second exhaust line 25.

Additionally, the first exhaust-gas turbine 28, second exhaust-gas turbine 32, the bypass 29, the pneumatic charge pressure control device 39 including the bypass valve 31, the charge pressure control valve 18, and the adaptation unit 21 may be included in an engine system 45 in the motor vehicle 10.

The motor vehicle 10 also includes the engine control unit 50 (e.g., controller) which can include code stored in memory executable by a processor to perform some component adjustment operations described herein. For instance, the engine control unit 50 may be configured to adjust the throttle flap 26, the turbine shut-off valve 36, the compressor shut-off valve 38, and/or the control valve 18. For instance, the engine control unit 50 may instruct the turbine shut-off valve 36 to open or close based on engine operating conditions. Moreover, the engine control unit 50 may adjust the opening of the throttle flap 26 based on engine operating conditions. As shown, the control valve 18 may be electronically actuated by the engine control unit 50. However, in other examples the control valve 18 may be passively actuated.

Figure 2:
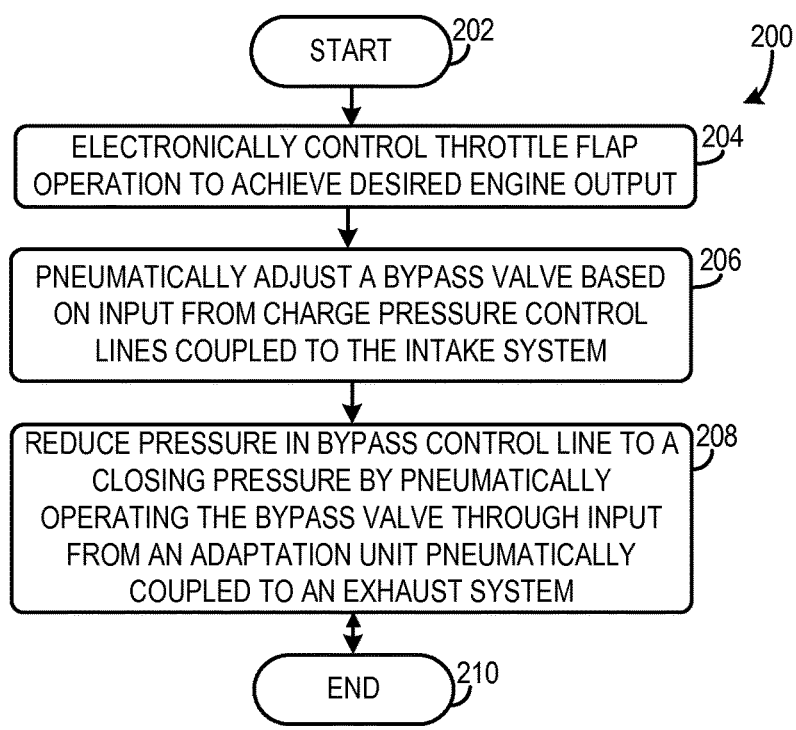
FIG. 2 shows a diagram of an adaptation method for operation of a motor vehicle.

The motor vehicle 10 is designed to implement an adaptation method. FIG. 2 illustrates an exemplary embodiment of an adaptation method 200 in the form of a flow diagram, from a start 200 to an end 212. Rather than manipulating a pressure drop in the supply air tract 15, which corresponds to a reduced charge pressure and has an influence on the engine operation, by operation of the charge-pressure control device 39, the adaptation method 200 is applied.

After the start 202, the method includes electronically controlling throttle flap operation to achieve desired engine output at 204, for example by adjusting an electric motor coupled to the throttle flap via the controller. Next at 206 the method includes pneumatically adjusting a bypass valve based on input from charge pressure control lines coupled to the intake system. At 208 the method includes reducing pressure in bypass control line to a closing pressure by pneumatically operating the bypass valve through input from an adaptation unit pneumatically coupled to an exhaust system. In this way, pressure from both the intake and exhaust system can be used to pneumatically control the bypass valve (e.g., wastegate). Step 208 may be implemented when a pressure in the exhaust and/or intake system drops below a threshold value. This type of pneumatic adjustment enables delays in bypass valve operation to be reduce during transition operation between turbocharger operation.

FIGS. 1 and 2 provide for an engine system for a motor vehicle comprising a first exhaust-gas turbine in a first turbocharger driven by exhaust gas from the engine, a second exhaust-gas turbine in a second turbocharger driven by exhaust gas from the engine a bypass coupled upstream and downstream of the first exhaust-gas turbine, and a pneumatic charge pressure control device including a bypass valve positioned in the bypass and a charge pressure control valve pneumatically coupled to the bypass valve and an intake line downstream of a first compressor included in the first turbocharger, the pneumatic charge pressure control device further including an adaptation unit pneumatically coupled to the bypass valve and an exhaust line upstream of the second exhaust-gas turbine.

FIGS. 1 and 2 also provide for an engine system where the pneumatic charge pressure control device is configured to close the bypass valve through operation of the adaptation unit when the pressure in the exhaust line upstream of the second exhaust-gas turbine surpasses a threshold value.

FIGS. 1 and 2 also provide for an engine system where the pneumatic charge pressure control device is configured to close the bypass valve through operation of the adaptation unit when the pressure in the intake line downstream of the first compressor.

FIGS. 1 and 2 also provide for an engine system where the adaptation unit is pneumatically coupled to an exhaust line upstream of the first exhaust-gas turbine.

FIGS. 1 and 2 also provide for an engine system where the pneumatic charge pressure control device is configured to close the bypass valve through operation of the adaptation unit when the pressure in the exhaust line upstream of the first exhaust-gas turbine drops below a threshold pressure.

FIGS. 1 and 2 also provide for an engine system where the first exhaust-gas turbine is arranged in parallel with the second exhaust-gas turbine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

In one example, a method for controlling a motor vehicle having a first exhaust-gas turbine and a second exhaust-gas turbine, a bypass configured to conduct the exhaust gas past the first exhaust-gas turbine, and an adaptation unit attached to a bypass control line coupled to a bypass valve positioned in the bypass, comprises:

reducing the pressure in the bypass control line through operation of an adaptation unit either after a predefined pressure drop is detected in the supply air tract or in the first exhaust line, and/or after a predefined pressure rise is detected in the second exhaust line.

In one example, during a first engine operating condition, the method includes reducing the pressure in the bypass control line through operation of an adaptation unit after the predefined pressure drop is detected in the supply air tract or in the first exhaust line. Further, during a second engine operating condition different from and mutually exclusive with the first operating condition, the method includes reducing the pressure in the bypass control line through operation of an adaptation unit after a predefined pressure rise is detected in the second exhaust line. In still further examples, in combination with the above features, the method may further include additional actions including those described with regard to FIG. 2, for example.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. As another example, the coolant level monitoring after engine shutdown may be in addition to coolant level monitoring techniques that are carried out and/or based on information during engine running and combusting conditions, such as engine coolant temperature measurements, knock feedback, and/or combinations thereof. In addition, the coolant temperature profile may include sampled coolant temperature at a multitude of sample times determined based on an expected exponential decay of coolant temperature toward ambient temperature. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A motor vehicle comprising:
an engine;
a supply air tract;
a throttle flap arranged in the supply air tract;
an exhaust tract which comprises a first exhaust line and a second exhaust line;
a first turbocharger including a first exhaust-gas turbine and a first compressor connected in torque-transmitting fashion to the first exhaust-gas turbine;
a second turbocharger which has a second exhaust-gas turbine and a second compressor connected in torque-transmitting fashion to the second exhaust-gas turbine, the first turbocharger operated on its own, or, at high loads, together with the second turbocharger;
where the first exhaust-gas turbine is arranged in the first exhaust line and the second exhaust-gas turbine is arranged in the second exhaust line, and the compressors are arranged in the supply air tract, and where the exhaust-gas turbines and thus the compressors are configured to be driven by exhaust gas that is generated during operation of the engine to generate a charge pressure in the supply air tract;
a bypass configured to conduct the exhaust gas past only the first exhaust-gas turbine;
a bypass valve equipped in the bypass, such that at least a part of the exhaust gas is conducted through the bypass in a first configuration of the valve and block said bypass in a second configuration of the valve; and
a charge-pressure control device, including a bypass control line pneumatically coupled to the first exhaust line, and an actuator connected to the bypass control line and configured to adjust the bypass valve, the charge-pressure control device configured to charge the bypass control line with a certain opening pressure when a predefined charge pressure prevails downstream of the throttle flap, the actuator configured to open the bypass valve, thereby opening up the bypass, when the opening pressure prevails; and
a pneumatically actuated adaptation unit coupled to the bypass control line and configured to pneumatically reduce a pressure in the bypass control line, independent of the charge-pressure control device, responsive to a pressure change in the first or second exhaust line, to a closing pressure which is lower than the opening pressure, the actuator configured to close the bypass valve, thereby blocking the bypass, when the bypass control line is charged with closing pressure.

2. The motor vehicle of claim 1, where the adaptation unit is configured to generate the closing pressure in the bypass control line in the event of a predefined pressure drop in the supply air tract.

3. The motor vehicle of claim 1, where the adaptation unit is configured to generate the closing pressure in the bypass control line in the event of a predefined pressure drop in the first exhaust line.

4. The motor vehicle of claim 1, where the adaptation unit is configured to generate the closing pressure in the bypass control line in the event of a predefined pressure rise in the second exhaust line.

5. The motor vehicle of claim 1, wherein the adaptation unit is connected via an indicator control line to the supply air tract upstream of the throttle flap, or to the first exhaust line upstream of the first exhaust-gas turbine, or to the second exhaust line upstream of the second exhaust-gas turbine.

6. The motor vehicle of claim 1, where the motor vehicle is configured to operate the first turbocharger simultaneously with the second turbocharger, during the operation of the engine.

7. A method for controlling a motor vehicle having a first exhaust-gas turbine of a first turbocharger in a first exhaust line and a second exhaust-gas turbine of a second turbocharger in a second exhaust line, a bypass configured to conduct exhaust gas selectively past the first exhaust-gas turbine, and an adaptation unit attached to a bypass control line coupled to a bypass valve positioned in the bypass, the adaptation unit pneumatically coupled to one of the first exhaust line, the second exhaust line, and a supply air tract, the method comprising:
reducing the pressure in the bypass control line through operation of the adaptation unit after one or more of a predefined pressure drop is pneumatically detected in the supply air tract or in the first exhaust line, and a predefined pressure rise is pneumatically detected in the second exhaust line, wherein the first turbocharger operates on its own, or, at high loads, together with the second turbocharger.

8. An engine system for a motor vehicle comprising:
a first exhaust-gas turbine in a first turbocharger driven by exhaust gas from an engine;
a second exhaust-gas turbine in a second turbocharger driven by exhaust gas from the engine, wherein the first turbocharger is operated on its own, or, at high loads, together with the second turbocharger;
a bypass coupled upstream and downstream of only the first exhaust-gas turbine; and
a pneumatic charge pressure control device including a bypass valve positioned in the bypass and a charge pressure control valve pneumatically coupled to the bypass valve and an intake line downstream of a first compressor included in the first turbocharger, the pneumatic charge pressure control device further including a pneumatically actuated adaptation unit coupled to the bypass valve and an exhaust line upstream of the second exhaust-gas turbine.

9. The engine system of claim 8, where the pneumatic charge pressure control device is configured to close the bypass valve through operation of the adaptation unit when a pressure in the exhaust line upstream of the second exhaust-gas turbine surpasses a threshold value.

10. The engine system of claim 8, where the pneumatic charge pressure control device is configured to close the bypass valve through operation of the adaptation unit when a pressure in the intake line downstream of the first compressor drops below a threshold pressure.

11. The engine system of claim 8, where the adaptation unit is coupled to an exhaust line upstream of the first exhaust-gas turbine.

12. The engine system of claim 11, where the pneumatic charge pressure control device is configured to close the bypass valve through operation of the adaptation unit when a pressure in the exhaust line upstream of the first exhaust-gas turbine drops below a threshold pressure.

13. The engine system of claim 8, where the first exhaust-gas turbine is arranged in parallel with the second exhaust-gas turbine.

* * * * *